USOO6085529A

United States Patent [19]
Galus et al.

[11] Patent Number: 6,085,529
[45] Date of Patent: Jul. 11, 2000

[54] PRECOOLER/CHILLER/REHEATER HEAT EXCHANGER FOR AIR DRYERS

[75] Inventors: Timothy J. Galus, Hamburg; David F. Fijas, Depew, both of N.Y.

[73] Assignee: American Precision Industries Inc., Buffalo, N.Y.

[21] Appl. No.: 09/086,899

[22] Filed: May 29, 1998

Related U.S. Application Data

[63] Continuation-in-part of application No. 08/866,808, May 30, 1997, Pat. No. 5,845,505.
[51] Int. Cl.[7] .................................................. F25D 17/06
[52] U.S. Cl. ......................... 62/93; 62/89; 62/90; 62/91; 62/92; 62/95; 62/96; 62/98; 62/272; 62/404; 165/66; 165/113; 165/150; 165/182
[58] Field of Search ................................... 62/89, 90, 91, 62/92, 93, 95, 96, 98, 272, 404; 165/66, 113, 150, 182

[56] References Cited

U.S. PATENT DOCUMENTS

| | | | |
|---|---|---|---|
| 2,935,856 | 5/1960 | Gifford | 62/93 |
| 3,541,807 | 11/1970 | Henderson | 62/272 |
| 3,585,808 | 6/1971 | Huffman | 62/93 |
| 3,979,565 | 9/1976 | Fernandes | 165/111 |
| 4,193,443 | 3/1980 | Nanaumi et al. | 165/66 |
| 4,235,081 | 11/1980 | Dowling | 62/93 |
| 4,242,110 | 12/1980 | Hynes | 55/269 |
| 4,410,035 | 10/1983 | White | 165/111 |
| 5,107,919 | 4/1992 | Basseen et al. | 165/47 |
| 5,299,633 | 4/1994 | Bruggeman et al. | 165/113 |

*Primary Examiner*—Henry Bennett
*Assistant Examiner*—Timothy J. Galus
*Attorney, Agent, or Firm*—Hodgson, Russ Andrews, Woods & Goodyear LLP

[57] ABSTRACT

A heat exchanger comprising a precooler and reheater core adjacent a chiller core, first heat transfer passages extending through both cores through which incoming air passes in a first direction, second heat transfer passages extending through the chiller core through which coolant passes in heat exchange relationship with incoming air and perpendicular to the first direction, and third heat transfer passages extending through the precooler and reheater core through which cooled air from the chiller core passes in heat exchange relationship with the incoming air and perpendicular to the first direction. A manifold contiguous with both cores conducts chilled air from the chiller core to the third set of heat transfer passages.

Incoming air is chilled in the chiller core and thereafter exchanges heat with the incoming air in the precooler and reheater core to precool the incoming air to form water droplets and to raise the temperature of the chilled air to a usable temperature. The precooled and moist incoming air exchanges heat with coolant in the chiller core such that the air is chilled to a low temperature condensing water vapor therein. The first heat transfer passages include fins staggered and disposed substantially perpendicular to the flow to create an undulating pattern there along for moisture separation within the precooler and chiller cores. The crossflow arrangement of passages in the cores of the heat exchanger advantageously enables the air leaving the precooler and reheater core to enter the chiller core directly without any intermediate channeling or piping.

17 Claims, 10 Drawing Sheets

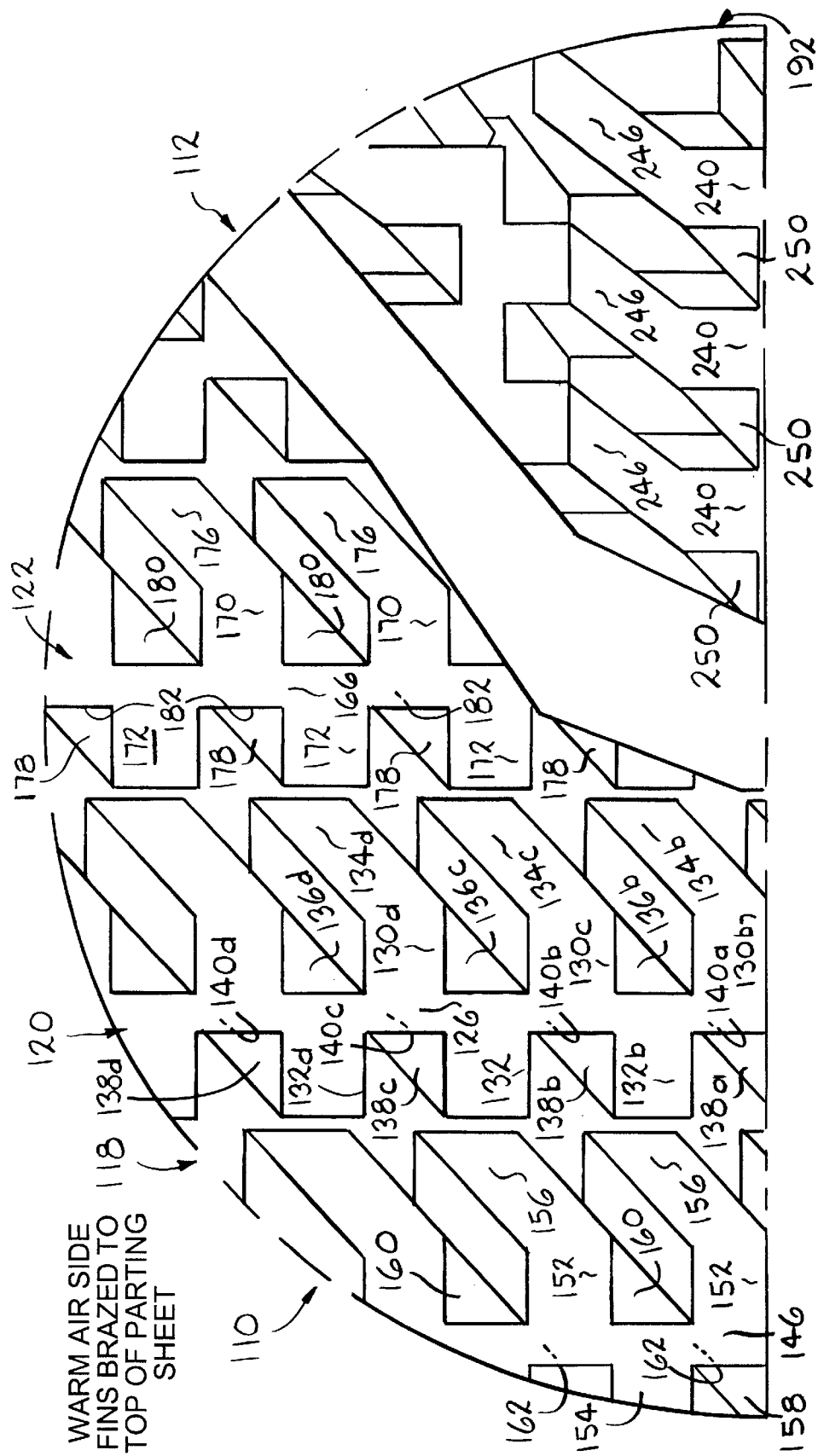

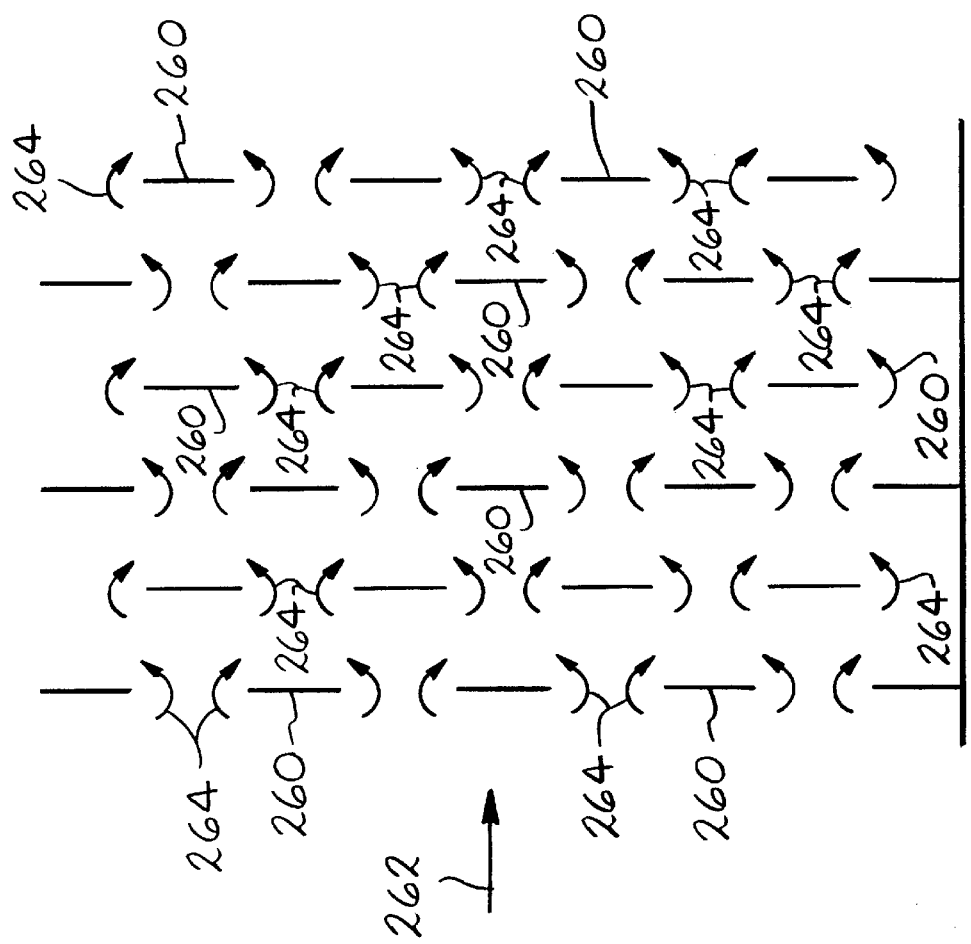

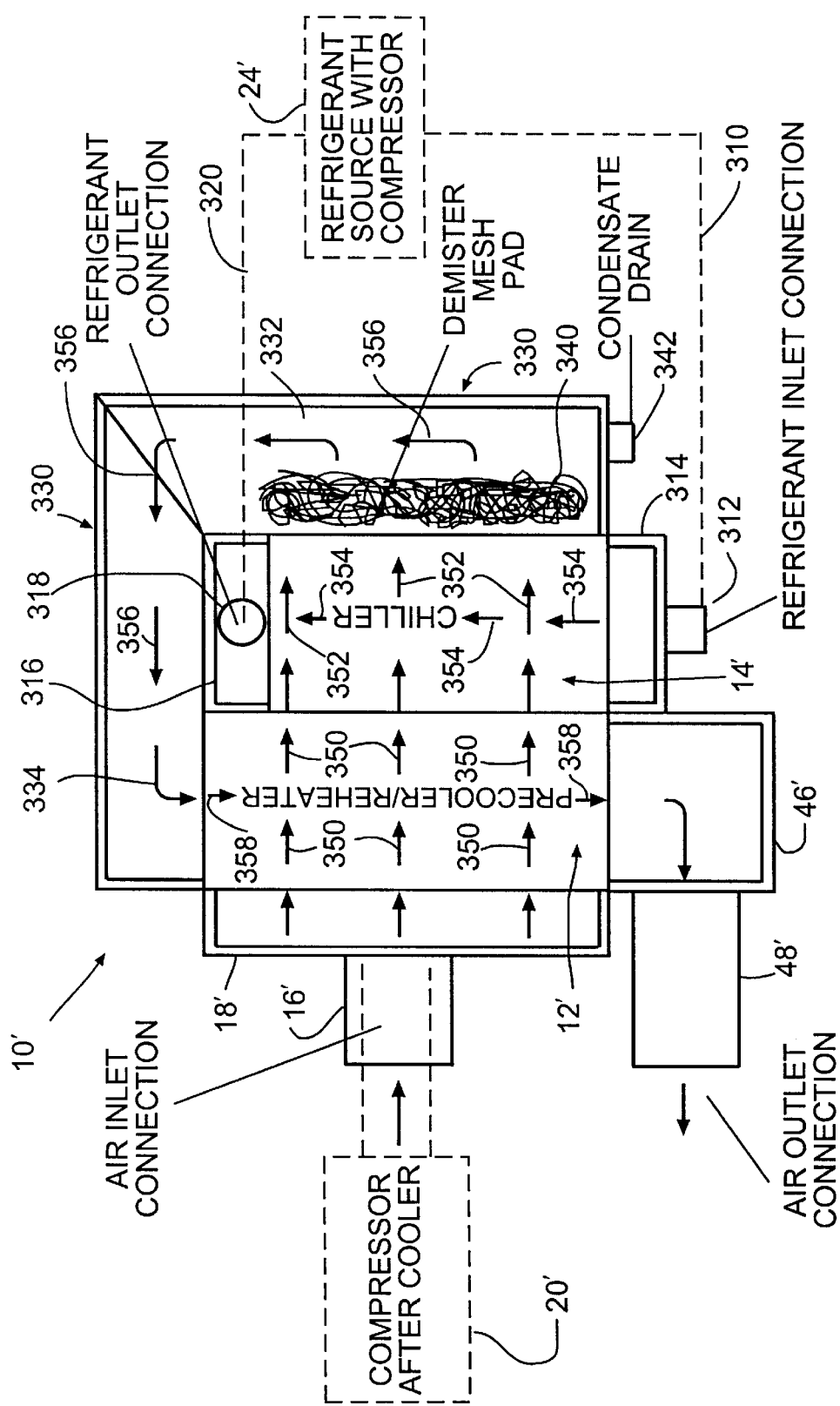

PRECOOLER/CHILLER/REHEATER HEAT EXCHANGER FOR AIR DRYERS

CROSS REFERENCE TO A RELATED APPLICATION

This application is a continuation-in-part of copending application Ser. No. 08/866,808 filed May 30, 1997, now U.S. Pat. No. 5,845,505 and entitled "Precooler/Chiller/Reheater Heat Exchanger For Air Dryers".

BACKGROUND OF THE INVENTION

This invention relates to the art of heat transfer, and more particularly to a new and improved heat exchanger for use in a refrigerated air dryer.

One area of use of the present invention is in refrigerated air driers wherein warm, moist air such as from the interior of a factory, and which typically is compressed, is cooled and dried and then conveyed to a location where it is used.

In any compressed air system, it is important to reduce the water content of the compressed air as much as possible before delivering the compressed air to the points of use. This is accomplished by using air or water cooled aftercoolers, moisture separators, and air dryers. Air dryers are available in many different types, and the present invention is illustrated with a non-cycling direct expansion refrigerated air dryer wherein the compressor operates continuously. This type of air dryer effectively reduces water content in compressed air by physically chilling the compressed air directly with a refrigeration circuit and thus reducing the capacity of the compressed air to hold water vapor. The water vapor in the chilled compressed air condenses out to liquid droplets. This combination of air and water droplets flows to a moisture separator that mechanically removes the droplets from the air stream. The main components in this type of refrigerated air dryer are the refrigeration system, the moisture separator, and two compressed air heat exchangers.

The first of these heat exchangers is a precooler/reheater. It precools warm saturated compressed air from the air compressor aftercooler by transferring heat to chilled air that is returning from the moisture separator. This part of the process also has the effect of reheating the chilled air before distribution to the end users. The importance of this heat exchanger is that it reduces some of the cooling load that the refrigeration system would otherwise have to handle. The refrigeration system becomes smaller, requiring less power for thriftier operation. The precooler/reheater heat exchanger sometimes is called an "economizer" because of this benefit. Another benefit offered by this heat exchanger is that it reheats the chilled air coming from the moisture separator. Reheating the chilled air reduces the chances that low ambient conditions can cause condensation in the air line downstream of the dryer. Reheating also reduces the likelihood of pipeline condensation or "sweating" that can occur on chilled surfaces in humid conditions.

The second heat exchanger is the air chiller. It takes the precooled air from the "economizer" and chills it down to the desired dewpoint temperature by rejecting heat into evaporating refrigerant on the other side of the heat exchanger. After being chilled, the air enters a moisture separator to remove the condensed water and then the air returns to the "economizer" for reheating.

In conventional refrigerated air dryers the foregoing heat exchangers appear in a variety of types. Most typical are the shell and tube, tube in tube, and plate type heat exchangers. Shell and tube heat exchangers tend to be heavy and they can be costly. Tube in tube heat exchangers are limited to the lower capacity air dryers. The shell and tube type and the tube in tube type heat exchangers both share the disadvantages of not being very compact and they require interconnecting piping between the economizer and the chiller. This adds weight, cost, complexity, and pressure drop to the system. Plate type heat exchangers made from brazing formed plates together may be compact but they lack flexibility due to tooling requirements. Piping to a brazed plate heat exchanger is difficult because the connection locations are so close together that they allow very few options for arranging the connections. Brazed plate heat exchangers generally use copper brazed stainless steel plates in their manufacture. This offers corrosion resistance but it makes them heavy and more costly.

Attempts in the prior art at building combination heat exchangers for air dryers have been counter current designs. Counter current heat exchangers have greater effectiveness but many designs require some kind of intermediate channeling when used in combinations for refrigerated air dryers. The result is more compact than two separate heat exchangers but many of the other disadvantages still remain. Combination heat exchangers made from copper brazed stainless steel plates can be pure counter current designs without any intermediate channeling. However, they still retain many of the disadvantages associated with this type of heat exchanger.

SUMMARY OF THE INVENTION

The present invention provides a heat exchanger comprising a precooler and reheater core and a chiller core in juxtaposed relation, a first set of heat transfer passages extending through both of the cores through which incoming air passes serially through both cores in a first direction, a second set of heat transfer passages extending through the chiller core in heat exchange relationship with the first set of heat transfer passages and through which coolant passes in heat exchange relationship with incoming air and in a direction substantially perpendicular to the first direction, and a third set of heat transfer passages extending through the precooler and reheater core in heat exchange relationship with the first set of heat transfer passages and through which cooled air from the chiller core passes in heat exchange relationship with the incoming air and in a direction substantially perpendicular to the first direction. There is provided conduit means for conducting chilled air from the chiller core to the third set of heat transfer passages. This can be in the form of a manifold contiguous with the two cores to avoid any external piping.

As a result, incoming air is chilled in the chiller core and chilled air therefrom exchanges heat with the incoming air in the precooler and reheater core to precool the incoming air where water droplets begin to form and to raise the temperature of the chilled air to a temperature for ultimate use. The precooled and moist incoming air exchanges heat with the coolant in the chiller core with the result that the air is chilled to a low temperature causing water vapor therein to condense to water droplets entrained in the flow of air. The first set of heat transfer passages includes heat transfer structures having fins staggered and disposed substantially perpendicular to the direction of flow therethrough. This creates an undulating or generally sinusoidal flow pattern along the passages which advantageously results in moisture separation occurring internally within the chiller core. The flow pattern also causes a reduced velocity flow along the passages. The crossflow arrangement of passages in the cores of the heat exchanger advantageously enables the air leaving the precooler and reheater core to enter the chiller core directly without any intermediate channeling or piping.

Thus, the precooler/chiller/reheater heat exchanger according to the present invention addresses the disadvantages of the prior art approaches by incorporating the two heat exchanger cores into one integral unit. The precooler/chiller/reheater heat exchanger is a combination of two brazed aluminum bar and plate heat exchangers. The flow paths through each heat exchanger core allow for stacking them into a very compact package. By employing the crossflow arrangement according to the present invention, the air flow can exit the precooler/reheater and enter directly into the chiller without any intermediate channeling to direct the flow. Crossflow can reduce the temperature effectiveness of the precooler/reheater, but the gains in simplicity, weight reduction, heat transfer rate, and pressure drop reduction offset that loss as will be described in detail presently.

There are many other advantages offered by the arrangement according to the present invention. Piping to the connections on the heat exchanger is not difficult at all because of the flexibility available in connection locations. The precooler/chiller/reheater is a brazed bar and plate core with welded on manifolds. This allows for logical connection placement harmonious with the different flow arrangements of various refrigerated air dryer designs. The heat transfer matrix within the precooler/chiller/reheater is an enhanced high resistance, low velocity geometry. That means greater heat transfer in a smaller package. Low velocity means that it is possible to incorporate integral moisture separation into the precooler/chiller/reheater manifolds. Thus, refrigerated air dryers with a precooler/chiller/reheater and integral moisture separation are simpler to build and less costly. Finally, aluminum construction offers the promise of lower weight and less cost than other types of air dryer heat exchangers.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 6 is a diagrammatic view illustrating one aspect of the operation of the heat exchanger of the present invention;

FIG. 11 is a side elevational view, partly diagrammatic, of a heat exchanger according to another embodiment of the present invention.

DETAILED DESCRIPTION OF THE ILLUSTRATED EMBODIMENTS

Figure 1:
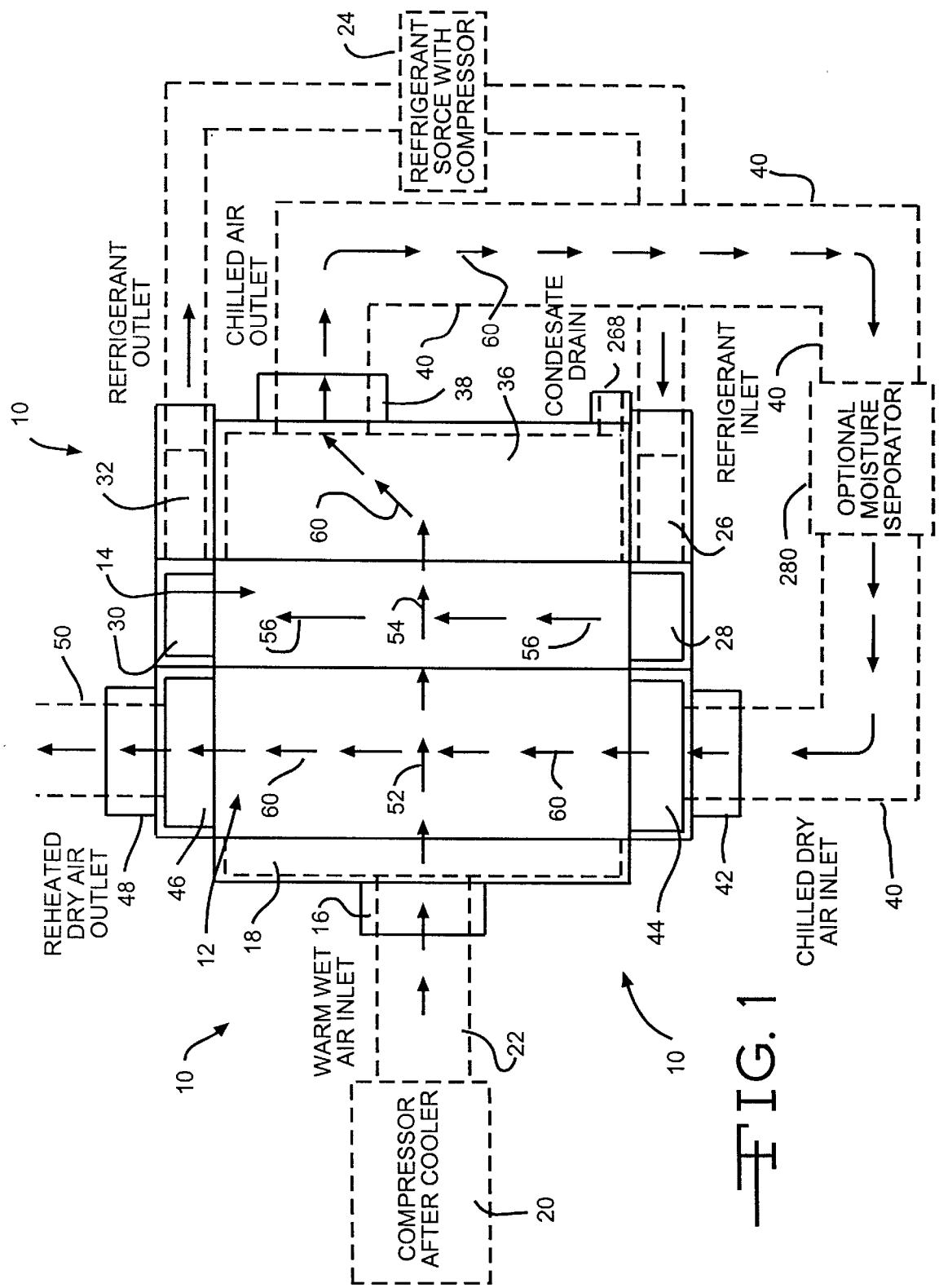
FIG. 1 is a side elevational view, partly diagrammatic, of a heat exchanger according to the present invention as it would appear in a refrigerated air dryer system.

FIG. 1 shows a heat exchanger 10 according to the present invention as it would appear in a refrigerated air dryer system for handling ambient air from either interior or exterior locations. Heat exchanger 10 includes a precooler-reheater core 12 and a chiller core 14 each of which will be described in detail presently. Warm moist air, for example from the discharge of an air compressor aftercooler, enters core 12 of heat exchanger 10 through an inlet fitting 16 and a manifold 18. Typically the input air is obtained from a compressor 20 connected to fitting 16 via a conduit designated 22. Coolant or refrigerant from a source 24 is supplied to chiller core 14 via an inlet fitting 26 and manifold 28. Refrigerant is returned from core 14 via a manifold 30 and outlet fitting 32 to the source 24. The chilled air exits the core 14 into a manifold 36 which is in communication with a chilled air outlet 38. Outlet 38 is connected via a conduit 40 to a chilled air inlet 42 and associated manifold 44 of the precooler reheater core 12. Air leaves core 12 via a manifold 46 and an outlet 48 which is connected via a conduit 50 to a point of use of the processed air.

The path of air travelling through heat exchanger 10 is indicated by the arrows in FIG. 1. The portion 52 of the path is through a stacked arrangement of heat transfer passages in core 12 in heat exchange relationship with an alternating stack of heat transfer passages through which the chilled air from core 14 passes in a manner which will be described presently. The portion 54 of the path is through a stacked arrangement of heat transfer passages in chiller core 14 which are in an alternating relationship with a series of stacked heat transfer passages which convey refrigerant in the direction of arrows 56. Thus, the flows of air and refrigerant in chiller core 14 are in a cross flow, i.e. substantially perpendicular, relationship. Chilled air leaving core 14 is conveyed to core 12 and flows along path portion 60. The chilled air in path portion 60 flows along the stacked arrangement of heat transfer passages in core 12 which are in heat exchange relationship with the alternating stacked arrangement of heat transfer passages through which the warm, moist incoming air flows along path portion 52. Thus, the flows of warm, incoming air and chilled air in core 12 are in a cross flow, i.e. substantially perpendicular, relationship. The chilled air in path portion 60 while in core 12 loses some heat to the warm moist air entering heat exchanger 10. This provides a precooling function to improve the overall efficiency. This also simultaneously results in the air being reheated for its ultimate use. In particular, the air is reheated to a temperature which is less than that of the warm air in inlet 16, 18 by an amount determined by the water vapor content and temperature of the air in inlet 16, 18.

Figure 2:
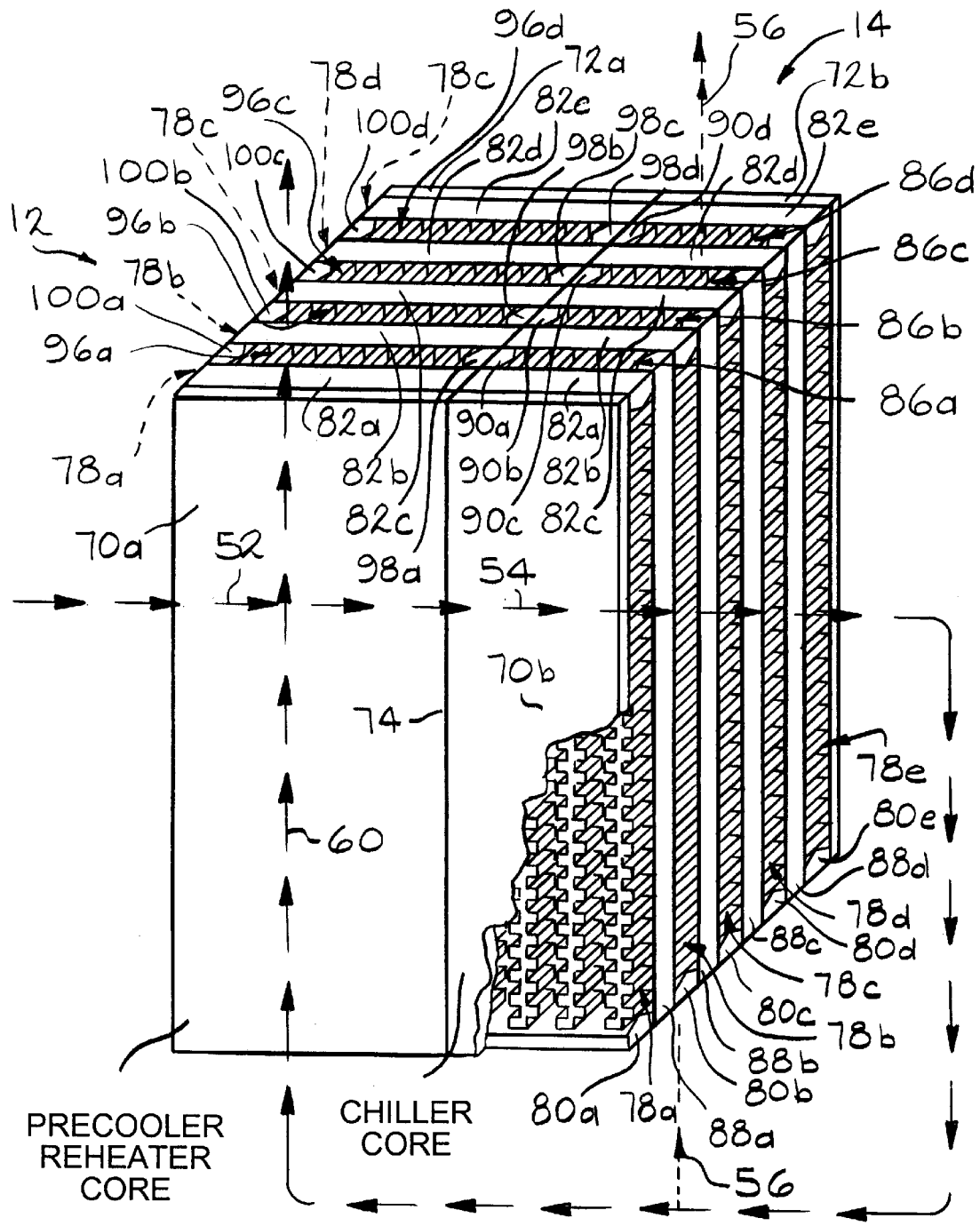
FIG. 2 is a perspective view, with parts removed, of the cores of the heat exchanger of FIG. 1.

FIG. 2 shows the precooler-reheater core 12 and chiller core 14 of heat exchanger 10 in greater detail. The two cores are closed on the opposite sides by spaced apart side walls or panels 70 and 72, and the separation 74 between panel sections 70a and 70b indicates the junction between the two cores. A plurality of spaced-apart heat transfer passages 78a–78e are included within and extend through both cores 12 and 14 horizontally as viewed in FIG. 2. Each passage, as will be described in detail presently, includes a heat transfer structure including a plurality of fins located between a pair of parting sheets (not shown in FIG. 2). The passages 78a–78e are closed at the bottom of the structure shown in FIG. 2 by corresponding bars 80a–80e, each of which extends along the entire length of each of the core structures 12 and 14. Similarly, passages 78a–78e are closed at the top of the structure shown in FIG. 2 by corresponding bars 82a–82e, each of which likewise extends along the entire length of each of the core structures 12 and 14. The passages 78a–78e at the left-hand ends as viewed in FIG. 2 are in fluid communication with inlet manifold 18 and inlet fitting 16 (not shown in FIG. 2). The passages 78a–78e extend along the entire dimension of core 12 and along the entire dimension of core 14, horizontally as viewed in FIG. 2, whereupon the right-hand ends of passages 78a–78e are in fluid communication with outlet manifold 36 and chilled air outlet 38 (not shown in FIG. 2). The fins of the heat transfer structure in each of the passages 78a–78e are disposed substantially perpendicular to the direction of flow of air indicated by the arrows in FIG. 2 designating the path portions 52 and 54. The fins are in a vertically staggered or offset arrangement as shown in FIG. 2 so that the flow of air along each of the passages 78a–78e from left to right as viewed in FIG. 2 is in an undulating or sinusoidal-like path as will be shown and described in detail presently.

Chiller core 14 includes a plurality of spaced apart heat transfer passages 86a–86d which extend vertically as viewed in FIG. 2, which extend along only the core 14, and are in an alternating or stacked relationship with the passages 78a–78e as shown in FIG. 2. Each passage, as will be described in detail presently, includes a heat transfer structure comprising a plurality of fins located between a pair of parting sheets which, in the core 14 of FIG. 2, are the parting sheets of the adjacent passages 78a–78e. Thus, the passages 86a–86d including the heat transfer structures thereof are in heat exchange relationship with adjacent passages 78a–78e and the heat transfer structures thereof. The passages 86a–86d are closed at the right-hand end of the structure as shown in FIG. 2 by corresponding bars 88a–88d each of which extends along the entire length of the right-hand side of core 14 as shown in FIG. 2. Similarly, passages 86a–86d are closed at the left hand end of core 14 as viewed in FIG. 2 by corresponding bars 90a–90d, each of which likewise extends along the entire length of the left-hand side of core 14. The passages 86a–86d at the lower end as viewed in FIG. 2 are in fluid communication with inlet manifold 28 and refrigerant inlet 26 (not shown in FIG. 2). The passages 86a–86d extend along the entire dimension of core 14 between bottom and top as viewed in FIG. 2 and thus are perpendicular to or cross-wise in relation to passages 78a–78e. The passages 86a–86d at the upper end as viewed in FIG. 2 are in fluid communication with outlet manifold 30 and refrigerant outlet 32 (not shown in FIG. 2). Also, like the heat transfer structures of passages 78a–78e, the fins of the heat transfer structures in passages 86a–86d are disposed substantially perpendicular to the direction of flow of refrigerant which flow path is indicated by the arrows 56 in FIG. 2. The fins are in a horizontally staggered or offset arrangement as viewed in FIG. 2 so that the flow of refrigerant through each of the passages 86a–86d from bottom to top as viewed in FIG. 2 is in an undulating or sinusoidal path as will be described in further detail presently.

Precooler-reheater core 12 includes a plurality of spaced-apart heat transfer passages 96a–96d which extend along core 12 vertically as viewed in FIG. 2 and are in an alternating or stacked relationship with passages 78a–78e as shown in FIG. 2. Each passage, as will be described in detail presently, includes a heat transfer structure including a plurality of fins located between a pair of parting sheets which, in the core 12 of FIG. 2, are the parting sheets of the passages 78a–78e. Thus, the passages 96a–96d including the heat transfer structures thereof are in heat exchange relationship with adjacent ones of the passages 78a–78e and the heat transfer structures thereof. The passages 96a–96d are closed at the right hand end of the structure as viewed in FIG. 2 by corresponding bars 98a–98d each of which extends along the entire length of the right-hand side of core 12. Furthermore, the bars 98a–98d of core 12 are in adjacent or contacting relation with the bars 90a–90d of core 14. Thus, two distinct flow regions, for refrigerant in core 14 and cooled air in core 12, are defined and isolated from each other in the structure of FIG. 2. Similarly, passages 96a–96d are closed at the left-hand end of core 12 as viewed in FIG. 2 by corresponding bars 100a–110d, each of which likewise extends along the entire length of the left-hand side of core 12. The passages 96a–96d at the lower end as viewed in FIG. 2 are in fluid communication with inlet manifold 44 and chilled dry air inlet 42 (not shown in FIG. 2). The passages 96a–96d extend along the entire dimension of core 12 between bottom and top as viewed in FIG. 2 and thus are perpendicular to or cross-wise in relation to passages 78a–78e. The passages 96a–96d at the upper end as viewed in FIG. 2 are in fluid communication with outlet manifold 46 and reheater dry air outlet 48 (not shown in FIG. 2). Unlike the structures of passages 78a–78e and 86a–86d, the fins of the heat transfer structures in each of the passages 96a–96d are disposed substantially parallel to the direction of flow of the chilled air indicated by the path portion represented by arrow 60 in FIG. 2. The flow of chilled air along core 12, from bottom to top as viewed in FIG. 2, which takes the longest path of fluid through the structure of FIG. 2, is in a relatively straight path from one end of core 12 to the other along path portion 60.

Figure 3B:
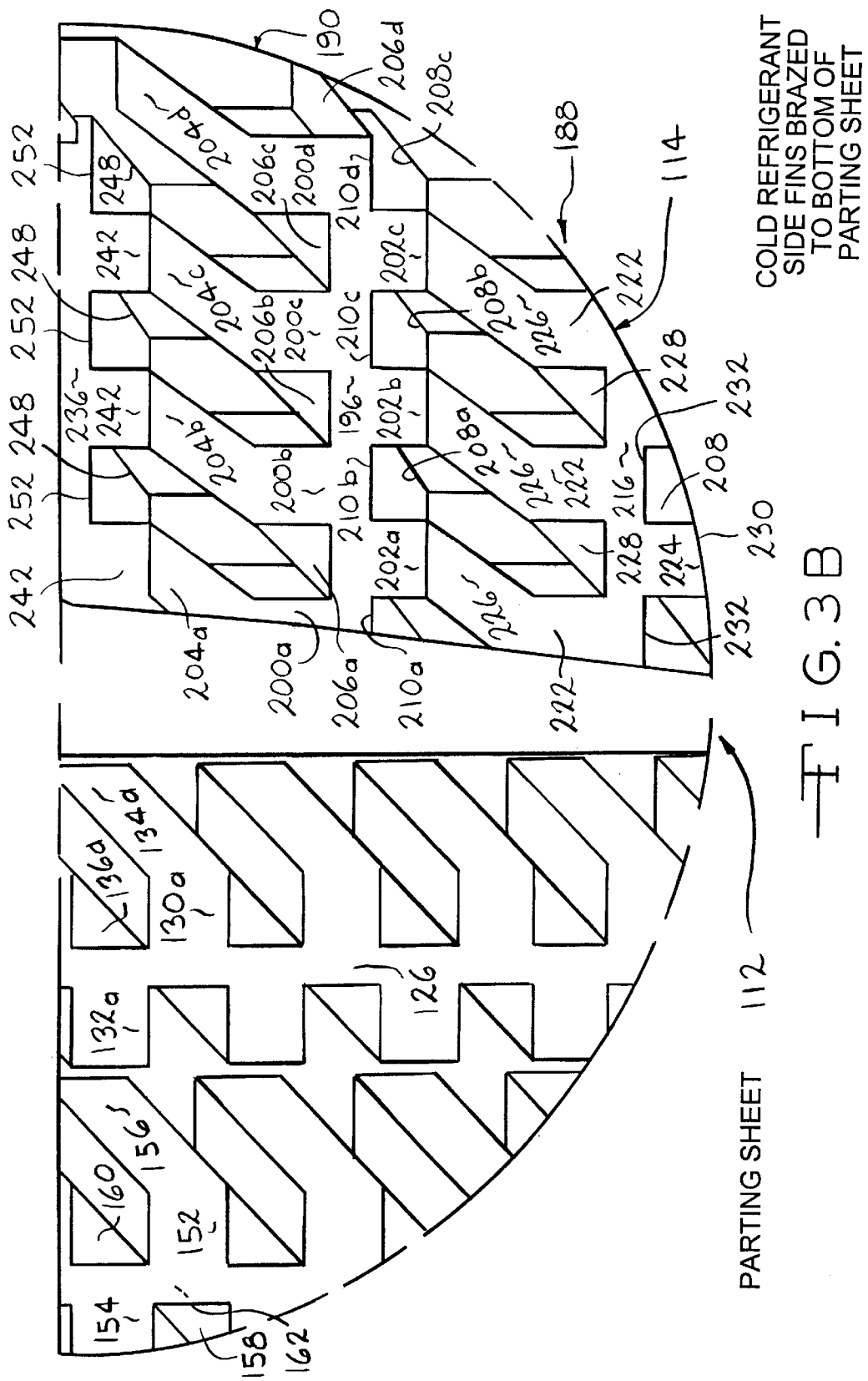
FIG. 3 is an enlarged fragmentary perspective view, with parts removed, of a portion of the chiller core in the heat exchanger of FIG. 2.

FIG. 3 shows in fragmentary perspective the heat transfer structure generally designated 110 of passage 78a, the parting sheet 112 between passages 78a and 86a, and the heat transfer structure generally designated 114 of passage 86a. Thus, in the right-hand portion of FIG. 3, the structure 110 and parting sheet 112 have been removed to show the structure 114. It is to be understood that the heat transfer structure 110 is identical to the heat transfer structure of each of the passages 78b, 78c, 78d and 78e. Similarly, it is to be understood that the heat transfer structure 114 is identical to the heat transfer structure of each of the passages 86b, 86c and 86d. In addition, the relationship between heat transfer structures 110 and 114 and the parting sheet 112 is the same as the relationship between the heat transfer structures of passages 78b, 78c, 78d, 78e and of passages 86b, 86c, 86d and the parting sheets therebetween.

Referring first to the heat transfer structure 110, it includes a series of fin structures arranged serially in the direction of fluid flow, the flow direction being horizontally as viewed in FIGS. 2 and 3, three of which fin structures are designated 118, 120 and 122 in FIG. 3. The fin structures 118,120 and 122, in turn, are disposed vertically as viewed in FIGS. 2 and 3. Each fin structure, for example the one designated 120, includes a thin, sheet-like, end body member 126 which extends along the entire length between the top and bottom of core 14 as viewed in FIG. 2. Member 126 is disposed in a plane parallel to the direction of fluid flow and is located at one end of the lateral dimension of the passage 78a. An identical end body member (not shown) is located at the opposite end of the lateral dimension of passage 78a and offset slightly from member 126 in the direction of fluid flow, i.e. horizontally as viewed in FIG. 3. A first series of spaced-apart end flanges extend in one direction from body member 126, for example the flanges designated 130a, 130b, 130c, 130d, etc. extending in a right hand direction horizontally as viewed in FIG. 3. The flanges 130 are spaced vertically as viewed in FIG. 3. A second series of spaced-apart end flanges extend in opposite directions from body 126, for example flanges 132a, 132b, 132c, 132d, etc. extending in a left hand direction horizontally as viewed in FIG. 3. The flanges 132 are spaced vertically as viewed in FIG. 3. The flanges 130 of the first series are offset or staggered in relation to the flanges 132 of the second series. The flanges 130 and 132 are thin, sheet-like, disposed in the same plane, and are formed integral with end body member 126.

The fin structure 120 further comprises a first series 134 of spaced lateral flanges or fins which extend laterally of passage 78a and at substantially right angles to corresponding ones of the end flanges 130. Preferably each end flange and lateral flange combination is integrally formed or bent from the thin sheet metal of which the entire fin structure is formed. Thus, as shown in FIG. 3, the lateral fins or flanges 134a, 134b, 134c, 134d etc. are in spaced relation, vertically as viewed in FIGS. 2 and 3, in the passage 78a. Each lateral flange or fin 134 terminates at the opposite end of the passage 78a where it joins the offset end body member mentioned above (not shown) at the opposite end of the lateral dimension of passage 78a.

The fin structure 120 further comprises a second series 136 of spaced lateral flanges or fins which extend laterally of passage 78a at substantially right angles to body member 126. Preferably each lateral flange 136 of the second series is integrally formed or bent from the thin sheet metal of which the entire heat transfer structure is formed. Thus, as shown in FIG. 3, the lateral fins or flanges 136a, 136b, 136c, 136d, etc. are in spaced relation, vertically as viewed in FIGS. 2 and 3, in the passage 78a. Each lateral flange or fin terminates at the opposite end of the passage 78a where it joins a corresponding end flange (not shown) which extends from the previously mentioned offset end body member (not shown) which end flange is similar to end flange 132 extending from end body member 126.

The fin structure 120 further comprises a third series 138 of spaced lateral flanges or fins which extend laterally of passage 78a at substantially right angles to corresponding ones of the end flanges 132. Preferably end flange and lateral flange combination is integrally formed or bent from the thin sheet metal of which the entire heat transfer structure is formed. Thus, as shown in FIG. 3, the lateral fins or flanges 138a, 138b, 138c, 138d, etc. are in spaced relation, vertically as viewed in FIGS. 2 and 3, in the passage 78a. Each lateral flange or fin terminates at the opposite end of the passage 78a where it joins another end body member (not shown) offset from the previously mentioned end body member in the direction of fluid flow at the opposite end of the lateral dimension of passage 78a.

The fin structure 120 further comprises a fourth series 140 of spaced lateral flanges or fins which extend laterally of passage 78a at substantially right angles to body member 126. Preferably each lateral flange 140 of the fourth series is integrally bent or formed from the thin sheet metal of which the entire heat transfer structure is formed. Thus, the lateral fins or flanges 140a, 140b, 140c, 140d, etc. are in spaced relation, vertically as viewed in FIGS. 2 and 3, in the passage 78a. Each lateral fin or flange terminates at the opposite end of the passage 78a where it joins an end flange (not shown) which extends from the other end body member (not shown) previously described.

The fins or lateral flanges 134 of the first series are offset or staggered in relation to the fins or flanges 138 of the third series, and the fins or flanges 136 of the second series are offset or staggered in relation to the fins or flanges 140 of the fourth series, the offset or staggered relation being in a vertical direction as viewed in FIGS. 2 and 3. The first and fourth series 134 and 140, respectively, are in vertical alignment as viewed in FIGS. 2 and 3, and the second and third series 136 and 138, respectively, are in vertical alignment. Thus, fluid flowing through the fin structure 120 in a direction generally horizontally from left to right as viewed in FIGS. 2 and 3 first encounters the fins or flanges 138 which cause the fluid flow to be diverted slightly upwardly and downwardly and around the flat fins 138, whereupon the fluid flows further along in the open space or region within the end flanges 132 and the corresponding end flanges on the opposite lateral end of passage 78a, whereupon the fluid flow encounters the fins or flanges 140 and 136 which cause the flow to be diverted slightly upwardly and downwardly and around the flat fins 140 and 136, whereupon the fluid flows further along in the open region or space within the end flanges 130 and the corresponding end flanges on the opposite lateral end of passage 78a, whereupon the fluid flow encounters the fins or flanges 134 which cause the flow to be diverted slightly upwardly and downwardly and around the flat fins 134, and then the flow continues generally horizontally from left to right as viewed in FIGS. 2 and 3. As a result, the pattern or shape of the path of fluid flow is undulating or generally sinusoidal proceeding in a horizontal direction from left to right as viewed in FIGS. 2 and 3 and which will be described in further detail presently.

The fin structure 118 is substantially identical to that of structure 120 and includes an end body member 146, a series of end flanges 152 and 154 and a series of lateral fins or flanges 156 and 158, 160 and 162. Structure 118 is located closely adjacent structure 120 in the direction of fluid flow along passage 78a. The lateral fins or flanges 156 of structure 118 are offset and staggered in a vertical direction relative to the adjacent lateral fins or flanges 138 of structure 120 so as to contribute further to the undulating or sinusoidal movement of fluid along the passage 78a. Similarly, the fin structure 122 is substantially identical to structure 120 including end body member 166, end flanges 170 and 172 and lateral fins or flanges 176, 178, 180 and 182. Structure 122 is located closely adjacent structure 120 in the direction of fluid flow along passage 78a. The lateral fins or flanges 178 of structure 122 are offset or staggered in a vertical direction relative to the lateral fins or flanges 134 of structure 120 so as to contribute further to the undulating or sinusoidal movement of fluid along passage 78a.

FIG. 3 thus illustrates in detail three fin structures 118, 120 and 122, it being understood that a large number of such fin structures are included within both cores 12 and 14 along the length of each passage 78a in a direction from left to right as viewed in FIG. 2. Such an arrangement is repeated in each of the other passages 78b, 78c, 78d, and 78e. The fin structures preferably are formed of thin sheet aluminum and are brazed to the parting sheets as previously described. In particular, the end body members and end flanges of each of the fin structures are brazed to the adjacent parting sheet.

The heat transfer structure 114 of passages 86a–86d is identical to heat transfer structure 110, disposed in coplanar relation with respect to structure 110 and oriented at an angle of 90° with respect to structure 110. Since the flow of fluid, i.e. refrigerant, through passages 86a–86d is at right angles to the flow of fluid through passages 78a–78e, heat transfer structure 114 also causes an undulating or generally sinusoidal fluid flow pattern along passages 86a–86d as will be described in detail presently.

Heat transfer structure 114 includes a series of fin structures arranged serially in the direction of fluid flow, i.e. vertically as viewed in FIGS. 2 and 3, three of which fin structures are designated 188,190 and 192 in FIG. 3. The fin structures 188, 190 and 192 are disposed horizontally as viewed in FIGS. 2 and 3. Each fin structure, for example the one designated 190, includes a thin, sheet-like end body member 196 which extends along the entire width of core 14 horizontally from one side to the other. Member 196 is disposed in a plane parallel to the direction of fluid flow and is located at one end of the lateral dimension of the passage 86a. An identical end body member (not shown) is located at the opposite end of the lateral dimension of passage 86a and offset slightly from member 196 in the direction of fluid flow, i.e. vertically as viewed in FIG. 3. A first series of spaced-apart end flanges extends in one direction from body member 196, for example the flanges designated 200a, 200b, 200c, 200d, etc. extending upwardly vertically as viewed in FIG. 3. The flanges are spaced horizontally as viewed in FIG. 3. A second series of spaced-apart end flanges extend in opposite directions from body 196, for example flanges 202a, 202b, 202c, etc. extending downwardly vertically as viewed in FIG. 3. The flanges 202 are spaced horizontally as viewed in FIG. 3. The flanges 200 of the first series are offset or staggered in relation to the flanges 202 of the second series. The flanges 200 and 202 are thin, sheet-like, disposed in the same plane, and are formed integral with each body member 196.

The fin structure 190 further comprises a first series 204 of spaced lateral flanges or fins which extend laterally of passage 86a and at substantially right angles to corresponding ones of the end flanges 200. Preferably, each end flange and lateral flange combination is integrally formed or bent from the thin sheet metal of which the entire fin structure is formed. Thus, as shown in FIG. 3, the lateral fins or flanges 204a, 204b, 204c, 204d, etc. are in spaced relation, horizontally as viewed in FIGS. 2 and 3, in the passage 86a. Each lateral flange or fin terminates at the opposite end of the passage 86a where it joins the offset end body member mentioned above (not shown) at the opposite end of the lateral dimension of the passage 86a.

The fin structure 190 further comprises a second series 206 of spaced lateral flanges or fins which extend laterally of passage 86a at substantially right angles to body member 196. Preferably each lateral flange 206 of the second series is integrally formed or bent from the thin sheet metal of which the entire heat transfer structure is formed. Thus, as shown in FIG. 3, the lateral fins or flanges 206a, 206b, 206c, etc. are in spaced relation, horizontally as viewed in FIGS. 2 and 3, in the passage 86a. Each lateral flange or fin terminates at the opposite end of the passage 86a where it joins an end flange (not shown) which extends from the previously mentioned offset end body member (not shown) which end flange is similar to end flange 202 extending from end body member 196.

The fin structure 190 further comprises a third series 208 of spaced lateral flanges or fins which extend laterally of passage 86a at substantially right angles to corresponding ones of the end flanges 202. Preferably each end flange and lateral flange combination is integrally formed or bent from the thin sheet metal of which the entire heat transfer structure is formed. Thus, as shown in FIG. 3, the lateral fins or flanges 208a, 208b, 208c, etc. are in spaced relation, horizontally as viewed in FIGS. 2 and 3, in the passage 86a. Each lateral flange or fin terminates at the opposite end of the passage 86a where it joins another end body member (not shown) offset from the previously mentioned end body member in the direction of fluid flow at the opposite end of the lateral dimension of passage 86a.

The fin structure 190 further comprises a fourth series 210 of spaced lateral fins or flanges which extend laterally of passage 86a at substantially right angles to body member 196. Preferably each lateral flange 210 of the fourth series is integrally formed or bent from the thin sheet metal of which the entire heat transfer structure is formed. Thus, the lateral fins or flanges 210a, 210b, 210c, 210d, etc. are in spaced relation, i.e. horizontally as viewed in FIGS. 2 and 3, in the passage 86a. Each lateral fin or flange terminates at the opposite end of the passage 86a where it joins an end flange (not shown) which extends from the other end body member (not shown) previously described.

The fins or lateral flanges 204 of the first series are offset or staggered in relation to the fins or flanges 208 of the third series, and the fins or flanges 206 of the second series are offset or staggered in relation to the fins or flanges 210 of the fourth series, the offset or staggered relation being in a horizontal direction as viewed in FIGS. 2 and 3. The first and fourth series 204 and 210, respectively, are in horizontal alignment as viewed in FIGS. 2 and 3, and the second and third series 206 and 208, respectively, are in vertical alignment. Thus, fluid, i.e. refrigerant, flowing through the fin structure 190 in a direction generally vertically from bottom to top as viewed in FIGS. 2 and 3 first encounters the fins or flanges 208 which cause the fluid flow to be diverted slightly to the left and right and then around the flat fins 208, whereupon the fluid flows further along in the open space or region within the end flanges 202 and the corresponding end flanges on the opposite lateral end of passage 86a, whereupon the fluid flow encounters the fins 210 and 206 which cause the flow to be diverted slightly to the left and right and around the flat fins 210 and 206, whereupon the fluid flows along in the open region or space within the end flanges 200 and the corresponding end flanges on the opposite lateral end of passage 86a, whereupon the fluid encounters the fins or flanges 204 which cause the flow to be diverted slightly to the left and right and around the flat fins 204, and then the flow continues generally upwardly vertically as viewed in a vertical direction from bottom to top as viewed in FIGS. 2 and 3. As a result, the pattern or shape of the path of fluid flow is undulating or generally sinusoidal proceeding in a vertical direction from bottom to top as viewed in FIGS. 2 and 3 and which will be described in further detail presently.

The fin structure 188 is substantially identical to that of structure 190 and includes an end body member 216, a series of end flanges 222 and 224 and a series of lateral fins or flanges 226, 228, 230 and 232. Structure 188 is located closely adjacent structure 120 in the direction of fluid flow along passage 86a. The lateral fins or flanges 226 of structure 188 are offset and staggered in a horizontal direction relative to the adjacent lateral fins or flanges 208 of structure 190 so as to contribute further to the undulating or sinusoidal movement of fluid along passage 86a. Similarly, the fin structure 192 is substantially identical to structure 190 including end body member 236, end flanges 240 and 242 and lateral fins or flanges 246, 248, 250 and 252. Structure 192 is located closely adjacent structure 190 in the direction of fluid flow along passage 86a. The lateral fins or flanges 248 of structure 192 are offset or staggered in a horizontal direction relative to the lateral fins or flanges 204 of structure 190 so as to contribute further to the undulating or sinusoidal movement of fluid along passage 86a.

FIG. 3 thus illustrates in detail three fin structures 188, 190 and 192, it being understood that a large number of such fin structures are included within core 14 along the length of passage 86a in a vertical direction as viewed in FIG. 2. Such an arrangement is repeated in each of the other passages 86b, 86c and 86d. The fin structures preferably are formed of thin sheet aluminum and are brazed to the parting sheets as previously described. In particular, the end body members and end flanges of each of the fin structures are brazed to the adjacent parting sheet.

The heat transfer structures in passages 78a–78e and in passages 86a–86d, illustrated in FIG. 3, all characterized by fins or flanges disposed in the passages substantially perpendicular to the direction of flow, are designated rotated lanced fin structures. These heat transfer structures are a modification of the conventional offset square fin structures where the fins are disposed parallel to the fluid flow in the passage containing the structures. The rotated lanced fin structures in the heat exchanger of the present invention are offset square fin structures wherein the fins are angled or rotated 90 degrees relative to the fluid flow.

Figure 5:
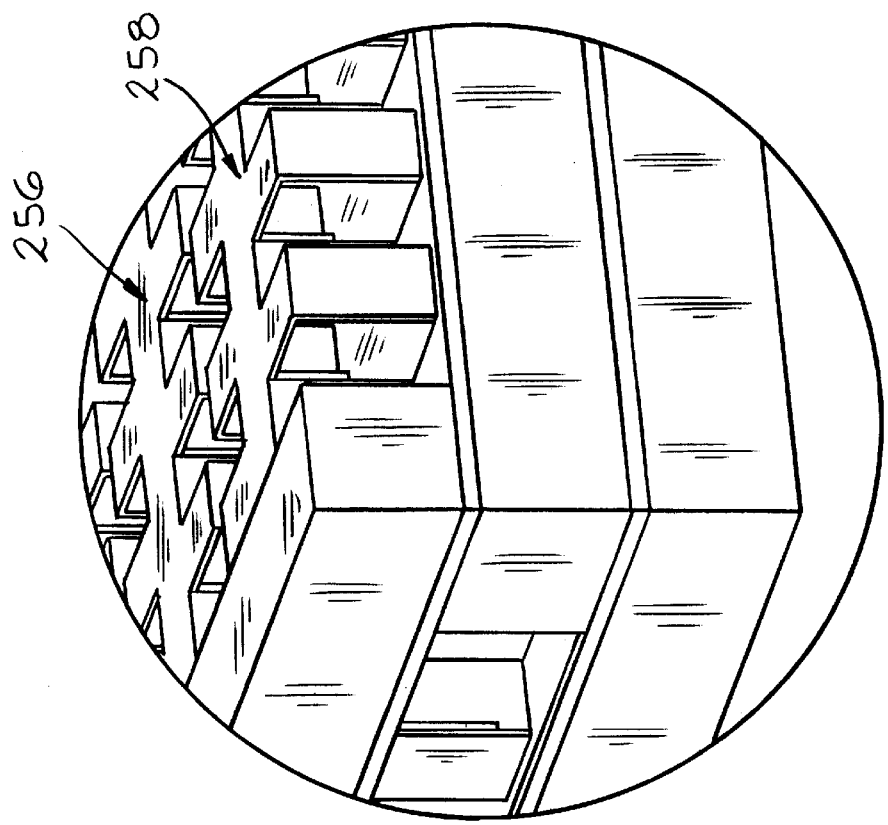
FIGS. 4 and 5 are enlarged fragmentary perspective views of a portion of the chiller core in the heat exchanger of FIG. 2.
Figure 4:
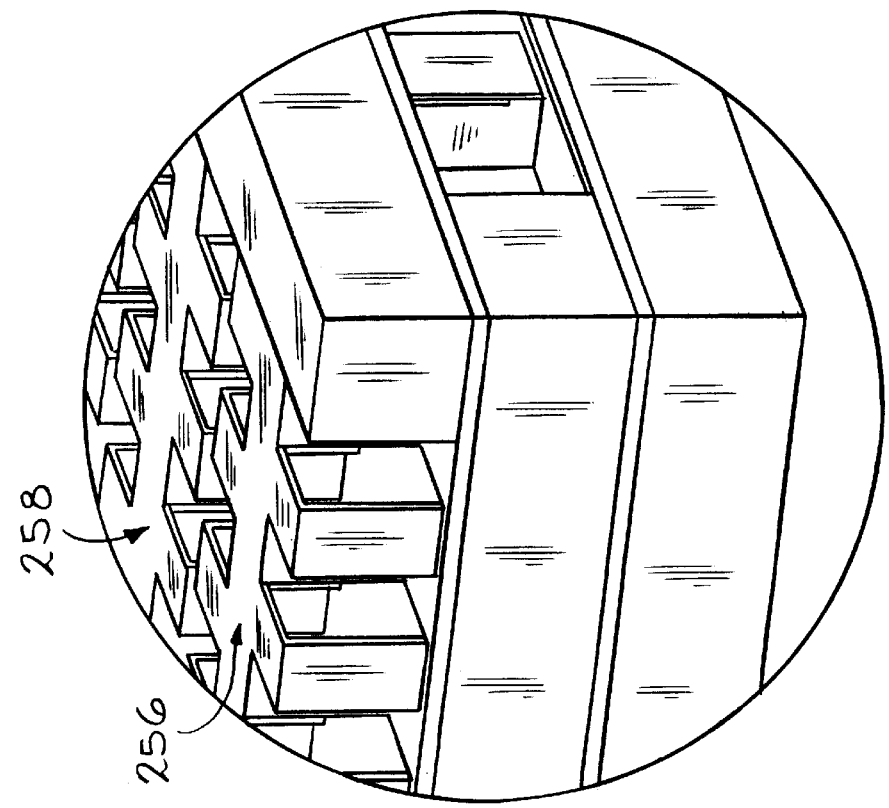

For purposes of further illustration heat transfer structures in passages 78a–78e and in passages 86a–86d of chiller core 14 also are shown in FIGS. 4 and 5. In particular, the heat transfer structure generally designated 256 and 258 in FIG. 4 illustrate the rotated lanced fin structures included in the passages 78a–78e and 86a–86d of chiller core 14. FIG. 5 is a mirror image of FIG. 4 to show the fins which are hidden from view in FIG. 4.

Thus, passages 78a–78e which extend through precooler/reheater core 12 and through chiller core 14, as well as passages 86a–86d which extend through chiller core 14 in cross-flow relation to passages 78a–78e, all include heat transfer structures characterized by fins or flanges disposed in the passages substantially perpendicular to the direction of fluid flow through the passages. The fins or flanges are spaced in a first direction along the passages in the direction of fluid flow, and they also are spaced in a second direction substantially normal or perpendicular to the direction of fluid flow. Such spacings allow fluid to flow along through the passages. In addition, adjacent sets of fins or flanges are staggered or offset along the second direction. As a result, fluid flowing along each passage encounters the flanges or fins and flows against and around them so as to result in an undulating or generally sinusoidal flow pattern in the direction of fluid flow along each passage.

The foregoing is illustrated diagrammatically in FIG. 6 wherein the fins or flanges 260 represent the flanges 134, 136, 138, 140, 156, 158, 160, 162, 176, 178, 180 and 182 in passages 78a–78e or the flanges 204, 206, 208, 210, 226, 228, 230, 232, 246, 248, 250 and 252 in passages 86a–86d. The direction of fluid flow through the particular passage is represented by arrow 262. The flow paths around the fins or flanges 260 are indicated by arrows 264. Thus proceeding from left to right as viewed in FIG. 6, which is the direction of fluid flow through the passage, the undulating or generally sinusoidal pattern of fluid flow around the fins or flanges 260 can be seen.

Figure 7:
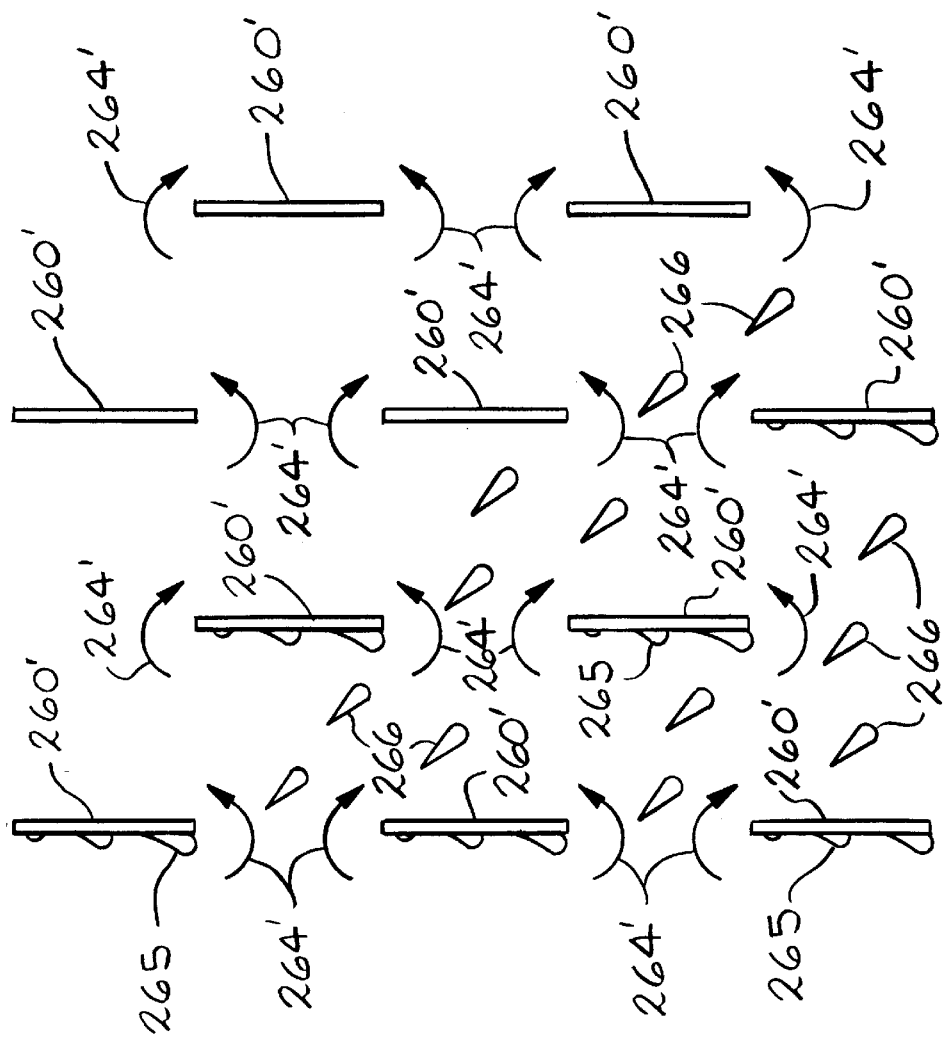
FIG. 7 is a diagrammatic view illustrating another aspect of the operation of the heat exchanger of the present invention.

The foregoing arrangement of the fins or flanges together with the low temperature in core 14 causes the warm, moist air flowing along passages 78a–78e in core 14 to release or condense the water vapor in the air. In particular, as the warm, moist air flows along passages 78a–78e through chiller core 14, the water vapor in the chilled compressed air condenses out to water droplets entrained in the flow of air. The flow impinging on the fins or flanges together with the change in direction of the flow around the fins or flanges as previously described causes the water droplets to separate out from the flow of air. This is illustrated in FIG. 7 which shows fins or flanges 260' identical to those designated 260 in FIG. 5 and located in the portions of passages 78a–78e within chiller core 14. The flow paths of air and entrained water droplets around fins or flanges 260' are designated 264' in FIG. 7. Some water collects in the form of droplets 265 on the upstream surface of the fins or flanges 260' and the remainder of the water is released from the air flow in the form of free droplets 266. Both forms of droplets 265 and 266 separated from the air flow fall by gravity to the bottom of core 14 where collected water is removed via a drain connection 268 shown in FIG. 1.

Thus another advantage of the heat transfer structure according to the present invention, characterized by fins or flanges disposed substantially perpendicular to the direction of fluid flow through the passages, is that moisture separation can be accomplished within the precooler core 12 and within the chiller core 14. This, in turn, avoids the need to provide a separate, external moisture separator. On the other hand, in some situations for example due to certain operational requirements, or due to the need to shorten the length of header 36 in the flow direction, or due to certain code requirements, a separate external moisture separator may be provided. In that case it is located at an appropriate point along conduit 40, for example as designated 280 in FIG. 1. Moisture separator 280 can be any one of various commercially available moisture separators well-known to those skilled in the art.

As previously described, unlike the heat transfer structures of passages 78a–78e and 86a–86d, the heat transfer structures in each of the passages 96a–96d include fins disposed substantially parallel to the direction of the flow of chilled air along core 12. The heat transfer structures in passages 96a–96d are conventional offset square fin structures well-known to those skilled in the art so that a detailed description thereof is believed to be unnecessary. Since the flow of chilled air along core 12, from bottom to top as viewed in FIG. 2, is the longest fluid flow path in the heat exchanger structure of FIG. 2, offset square fin structures are employed in passages 96a–96d, with the fins thereof disposed substantially parallel to the fluid flow, so as not to impose an excessive pressure drop on the fluid flow.

Figure 9:
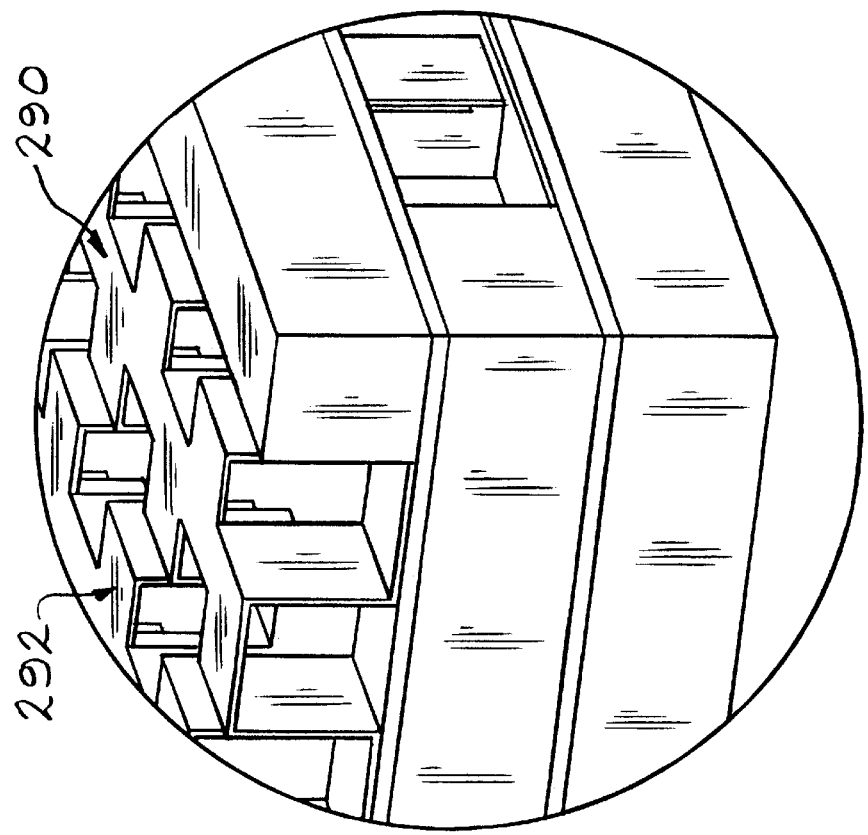
FIGS. 8 and 9 are enlarged fragmentary perspective views of a portion of the precooler-reheater core in the heat exchanger of FIG. 2.
Figure 8:
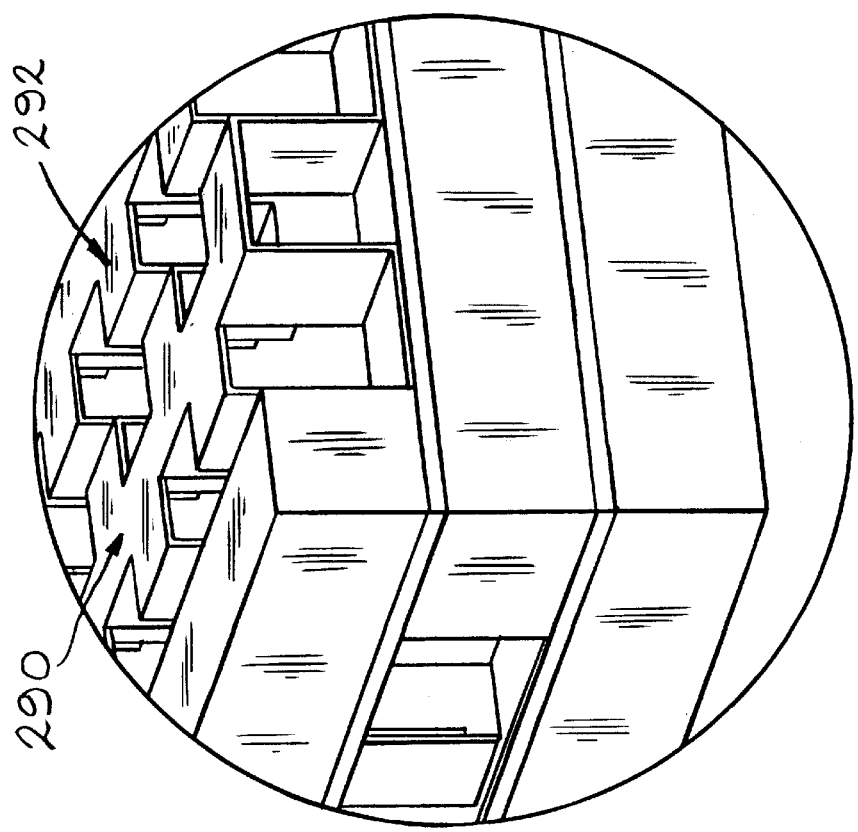

FIGS. 8 and 9 illustrate briefly the heat transfer structures in passages 96a–96d of precooler-reheater core 12. In particular, the heat transfer structures generally designated 290 and 292 in FIG. 8 illustrate the offset square fin structures included in the passages 96a–96d of precooler-reheater core 12. FIG. 9 is a mirror image of FIG. 8 to show the fins which are hidden form view in FIG. 8.

The heat exchanger 10 of the present invention operates in the following manner. Warm, moist air from compressor/aftercooler 20 flows through conduit 22 into inlet 16 and then into manifold 18 from which the warm moist air enters passages 78a–78e. The warm moist air flows along passages 78a–78e through precooler-reheater core 12. By means of the heat transfer structures in passages 78a–78e and in passages 96a–96d previously described, the warm moist air flowing along passages 78a–78e exchanges heat with the chilled air flowing along passages 96a–96d. Thus, the warm, moist incoming air is precooled as it flows along passages 78a–78e in core 12 from left to right as viewed in FIGS. 1 and 2. This causes the water vapor to begin condensing to water droplets. In addition, the rotated lanced fin heat transfer structures in passages 78a–78e convert the flow of warm, moist air into an undulating or generally sinusoidal flow pattern which causes a reduction in velocity of the flow.

Refrigerant, typically Freon R-22, flows from source 24 to inlet fitting 26 and then to manifold 28 from which it enters passages 86*a*–86*d* in chiller core 14. Refrigerant flows along passages 86*a*–86*d* from bottom to top of core 14 as viewed in FIGS. 1 and 2 whereupon it enters manifold 30 and flows through outlet 32 back to the source 24. The refrigerant recirculates through this continuous circuit.

The precooled, moist air leaves precooler-reheater core 12 and continues along the passages 78*a*–78*e* through chiller core 14. By means of the heat transfer structures in passages 78*a*–78*e* and in passages 86*a*–86*d* previously described, the precooled moist air flowing along passages 78*a*–78*e* exchanges heat with refrigerant flowing along passages 86*a*–86*d*. The flows of the precooled, moist air along passages 78*a*–78*e* and refrigerant along passages 86*a*–86*d* are in crossflow or orthogonal relation to each other. Thus, the precooled, moist air is chilled to a low temperature as it flows along passages 78*a*–78*e* in core 12 and in core 14 from left to right as viewed in FIGS. 1 and 2. This causes the water vapor in the chilled compressed air to condense in both cores 12 and 14 to water droplets entrained in the flow of air. The rotated lanced fin heat transfer structures in passages 78*a*–78*e* further reduce the velocity of the air as it flows through chiller core 14. The rotated lanced fin heat transfer structures in passages 78*a*–78*e* also cause separation of the water droplets from the air flow along core 14 as described in connection with FIG. 7 with the result that the water falls by gravity to the lower portion of core 14 as viewed in FIGS. 1 and 2 for removal via drain connection 268.

Chilled, dry air leaves passages 78*a*–78*e* of core 14 and flows into manifold 36 and through chilled air outlet 38 whereupon it flows along conduit 40 and then through chilled dry air inlet 42 into manifold 44 from which it enters passages 96*a*–96*d* of precooler-reheater core 12. The chilled, dry air flows along passages 96*a*–96*d* from bottom to top of core 12 as viewed in FIGS. 1 and 2. By means of the heat transfer structures in passages 78*a*–78*e* and passages 96*a*–96*d* previously described, the warm, moist incoming air flowing along passages 78*a*–78*e* in core 12 exchanges heat with the chilled, dry air flowing along passages 96*a*–96*d*. The flows of the warm, moist incoming air along passages 78*a*–78*e* and chilled, dry air along passages 86*a*–86*d* are in crossflow or orthogonal relation to each other. As a result, as previously described, the warm, moist incoming air is precooled as it flows along passages 78*a*–78*e* in core 12 from left to right as viewed in FIGS. 1 and 2. This precooling function advantageously reduces some of the cooling load that the chiller core 14 otherwise would be required to handle. This, in turn, enables the chiller core 14 to be smaller in size requiring less refrigeration system power for more economical and efficient operation. Also, the chilled, dry air is elevated in temperature as it flows along passages 96*a*–96*d* in core 12 from bottom to top as viewed in FIGS. 1 and 2. The air temperature is elevated for its ultimate use. Reheating the chilled air also reduces the chances that low ambient temperature conditions can cause condensation in the output air line leading from heat exchanger 10 to the location of ultimate use. Reheating the chilled air also reduces the likelihood of condensation or sweating on the output air line that can occur on chilled surfaces in humid conditions.

In the heat exchanger 10 of the present invention, the crossflow arrangement in cores 12 and 14 enables the precooled air in passages 78*a*–78*e* to exit core 12 and enter chiller core 14 directly without any intermediate channeling to direct the flow. Avoiding intermediate piping provides advantages of simplicity in construction and reduction in weight of the heat exchanger 10. The rotated lanced fin structures in passages 78*a*–78*e* through cores 12 and 14 provide moisture separation within the heat exchanger and the resulting advantage of elimination of an external moisture separator. The undulating or sinusoidal-like flow along the passages containing the rotated lanced fin structures increases the turbulence of the flow along those passages. The increased turbulence, in turn, increases the heat conductance. From the relationship:

$$Q = UA(LMTD)$$

where Q is capacity, U is conductance, A is area of a heat transfer structure, and LMTD is the temperature driving force for heat transfer, it can be seen that the increased U due to increased turbulence enables the lengths of the heat transfer passages to be decreased with a resulting decrease in pressure drop.

By way of example, for an illustrative heat exchanger 10 used in a refrigerated air dryer system of the type shown in FIG. 1 and operating at a flow rate of 300 cubic feet per minute, the dimensions of precooler-reheater core 12 are 9.375 inches vertical height and 3.5 inches horizontal width as viewed in FIG. 2 and 6.813 inches in depth, and the dimensions of chiller core 14 are 9.375 inches vertical height and 2.25 horizontal width as viewed in FIG. 2 and 6.813 inches in depth. The temperature of the moist air entering passages 78 of core 12 is 100° F., and the average temperature of the precooled air leaving core 12 is 68.2° F. The pressure of the air entering passages 78 of core 12 is 100 psig, and the pressure drop in the passages 78 in core 12 is 0.56 psi.

The average temperature of the precooled air entering passages 78 of chiller core 14 is 68.2° F., and the average temperature of the chilled air leaving core 14 is 38.8° F. The pressure of the air entering passages 78 of core 14 is 99.4 psig, and the pressure drop in the passages 78 in core 14 is 0.34 psi. The evaporation temperature of the R-22 Freon refrigerant in passages 86 of core 14 is 34.0° F. and the pressure is 60 psig. The temperature of the R-22 refrigerant leaving core 14 through header 30 is elevated a few degrees to insure that only gas returns to the refrigerant compressor of source 24. This is superheating requirement which will be discussed in detail presently.

The temperature of the chilled air entering passages 96 of precooler-reheater core 12 is 38.8° F., and the average temperature of the air leaving core 12 is 85° F. The pressure of the air entering passages 96 of core 12 is 98.1 psig, and the pressure drop in the passages 96 in core 12 is 0.19 psi.

In the rotated lanced fin structures in passages 78 of precooler-reheater core 12, the fins are 0.125 inch in height, and there are eight fins per inch along each passage 78. The fins are of aluminum having a thickness of 0.006 inch. The number of the passages 78 in the illustrative heat exchanger is 23. The rotated lanced fin structure in passages 86 of chiller core 14 are of aluminum 0.125 inch in height and 0.006 inch thick. There are eight fins per inch in the passages 86 which total 22 in number of passages. In the offset square fin structures in passages 96 of core 12, the fins are 0.125 inch in height, and there are eight fins per inch along each passage. The fins are of aluminum having a thickness of 0.006 inch. The number of the passages 96 in the illustrative heat exchanger is 22. The parting sheets separating the various passages are of brazed aluminum having a thickness of 0.024 inch.

Figure 10:
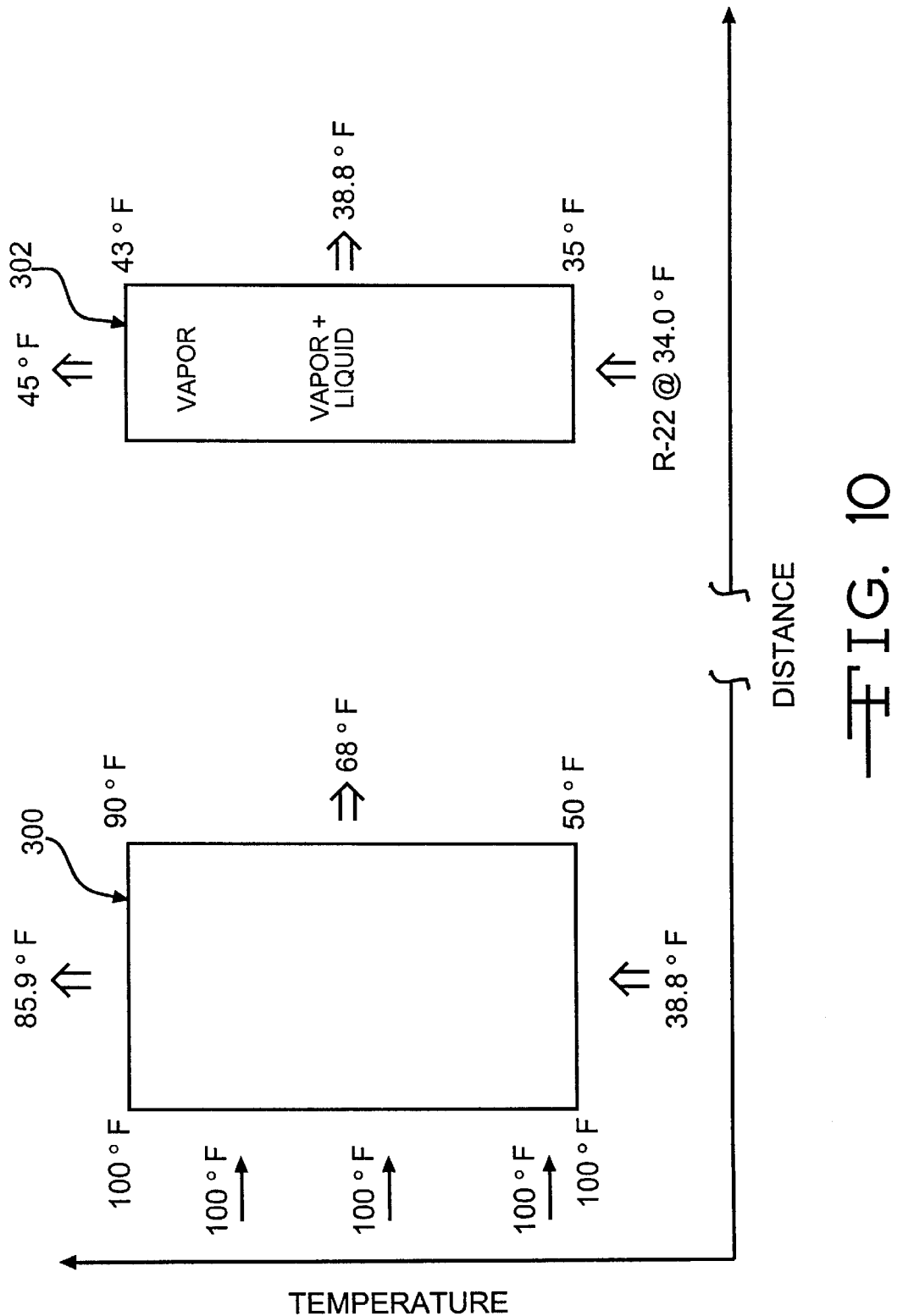
FIG. 10 is a graph including temperature profiles for the precooler-reheater core and the chiller core in the heat exchanger of the present invention.

As previously described, the superheating requirement necessitates elevating the temperature of refrigerant leaving passages 86*a*–86*d* of core 14 so that only gas and no liquid is returned to the refrigerant compressor. Otherwise, any liquid returned to the compressor could damage it. The crossflow arrangement of passages 86a–86d and passages 78a–78d according to the present invention aide in meeting this superheating requirement. This can be seen from considering the temperature profiles of cores 12 and 14 represented schematically at 300 and 302 in FIG. 10. The left-hand end of profile 300 is moist air entering passages 78 of core 12 at 100° F. The right-hand end of profile 300 shows the temperature range of precooled air in passages 78a–78e leaving core 12 from about 50° F. at the bottom of core 12 in the vicinity of the chilled air entering passages 96 at 38.8° F., to about 90° F. at the top of core 12. The average temperature of 68.2° F. of precooled air leaving core 12 is indicated on profile 300.

The lower end of profile 302 is R-22 refrigerant entering passages 86a–86d of core 14 and the regions of vapor plus liquid and vapor within core 14 are shown. The right-hand end of profile 302 shows the temperature range of chilled air leaving passages 78a–78e of core 14 from 35° F. at the bottom of core 14 in the vicinity of incoming refrigerant to 43° F. near the top of core 14. The average temperature of 38.8° F. of chilled air leaving core 14 is indicated on profile 302.

What is important to note is from considering the top regions of both profiles 300 and 302, the 90° F. air leaving core 12 in the upper region enters the upper region of core 14 to superheat the refrigerant leaving the upper region of core 14 before it enters header 30 for return to the refrigerant compressor. In particular, the 90° F. air in passages 78a–78e leaving the upper end of core 12 and entering the upper end of core 14 as viewed in FIG. 2 exchanges heat with the 43° F. refrigerant in passages 86a–86d in the upper end of core 14. This is a result of the crossflow or orthogonal relationship between passages 78 and 86. The foregoing heat exchange provides the superheating to elevate the temperature of refrigerant leaving core 14 to 45° F. as indicated on profile 302 so as to insure that only gas returns to the refrigerant compressor.

Thus, in the crossflow arrangement of passages 78 and 86 according to the present invention, superheating of refrigerant is carried out at the 90° F. temperature of the upper portion of core 12 and its temperature profile rather than at the 68.2° F. average temperature of precooled air leaving core 12. Because superheating is carried out at the higher 90° F. temperature in the crossflow arrangement of the present invention, less surface area is needed for the superheating because of the higher temperature driving force. This is in contrast to prior art counterflow arrangements which must carry out superheating of refrigerant at the relatively lower average temperature of air leaving the precooler/reheater core, i.e. at 68.2° F. The prior art counterflow arrangements accordingly need a relatively larger surface area to carry out the superheating because of the relatively lower temperature driving force.

FIG. 11 illustrates a heat exchanger 10' according to another embodiment of the present invention. In FIG. 11 components similar to those of the embodiment of FIGS. 1–10 are identified by the same reference numerals provided with a prime designation. Thus, heat exchanger 10' includes precooler/reheater core 12' and chiller core 14' having structures identical to those of cores 12 and 14, respectively. Heat exchanger 10' is shown in FIG. 11 as if would appear in a refrigerated air dryer system for handling ambient air from either interior or exterior locations. As in the embodiment of FIG. 1, warm moist air from the discharge of an air compressor aftercooler 20' enters core 12' of heat exchanger 10' through an inlet fitting 16' and a manifold 18'. Coolant or refrigerant from a source 24' including a compressor is supplied to chiller core 14' via a line 310, inlet fitting 312 and manifold 314. Refrigerant is returned from core 14' via a manifold 316, outlet fitting 318 and line 320.

In accordance with this embodiment of the present invention, chilled air leaving chiller core 14' is conducted to precooler/reheater core 12' by manifold means generally designated 330 in FIG. 11 having a first section 332 contiguous with chiller core 14' and a second section 334 contiguous with both chiller core 14' and precooler/reheater core 12'. In the arrangement shown, the sections 332 and 334 are disposed at substantially right angles to each other. The first section 332 of manifold means 330 is in fluid communication with the previously described set of heat transfer passages 78 (not shown in FIG. 11) of chiller core 14' along substantially the entire vertical length of chiller core 14' as viewed in FIG. 11. The second section 334 of manifold means 330 has an outlet in fluid communication with the previously described set of heat transfer passages 96 (not shown in FIG. 11) of precooler/reheater core 12' and at the upper end of core 12' as viewed in FIG. 11. Heat exchanger 10' is oriented so that manifold section 332 is disposed generally vertically and manifold section 334 is disposed generally horizontally and is located above the cores 12' and 14'.

There is provided moisture separation means in the form of a demister mesh pad 340 in manifold section 332, preferably extending along the junction between the passages of core 14' and the interior of manifold section 332. A condensate drain 342 at the lower end of manifold section 332 as viewed in FIG. 11 serves to remove separated moisture.

Air leaves precooler and reheater core 12' via a manifold 46' and an outlet 48' which is connected by a conduit (not shown) to a location of use of the processed air.

The path of air travelling through heat exchanger 10 is indicated by the arrows in FIG. 11. The portion 350 of the path is through the stacked arrangement of heat transfer passages in core 12' in heat exchange relationship with the alternating stack of heat transfer passages through which the chilled air from core 14' passes in a manner similar to that of the embodiment of FIGS. 1–10. The portion 352 of the path is through the stacked arrangement of heat transfer of heat transfer passages in chiller core 14' which are in the alternating relationship with the series of stacked heat transfer passages which convey refrigerant in the direction of arrows 354, likewise in a manner similar to that of the embodiment of FIGS. 1–10. Thus, the flows of air and refrigerant in chiller core 14' are in a cross flow, i.e., substantially perpendicular, relationship as in the embodiment of FIGS. 1–10. Chilled air leaving core 14' is conveyed to core 12' by manifold means 330 and flows along path portion 356. The chilled air from manifold section 334 flows in the direction of arrows 358 along the stacked arrangement of heat transfer passages in core 12' which are in heat exchange relationship with the alternating stacked arrangement of heat transfer passages through which the warm, moist incoming air flows along path portion 350. Thus, the flows of warm, incoming air and chilled air in core 12' are in a cross flow, i.e., substantially perpendicular, relationship as in the embodiment of FIGS. 1–10. The chilled air in path portion 358 while in core 12' loses some heat to the warm moist air entering heat exchanger 10'. As in the embodiment of FIGS. 1–10, this provides a precooling function to improve the overall efficiency. This also simultaneously results in the air being reheated for its ultimate use. In particular, the air is reheated to a temperature which is less than that of the warm air in inlet 16', 18' by an amount determined by the water vapor content and temperature of the air in inlet 16', 18'.

The heat exchanger 10' according to this embodiment of the present invention takes advantage of the low exit face air velocity from the chiller core 14' to incorporate integral separation. At normal operating conditions, much of the droplet separation occurs in the heat transfer matrix of cores 12' and 14'. The stainless steel wire mesh pad 340 mounted flush with the air side exit face of the chiller core 14' removes any remaining droplets suspended in the air flow. The condensate drain 342 mounted at the bottom of the chilled air manifold section 332 removes the separated moisture. The dry chilled air returns to the reheater through the inverted "L" shaped wrap around manifold 330 that completely eliminates any need for external piping between the chiller 14' and the reheater 12'. Lengthening the precooler/reheater core 12', in a vertical direction as viewed in FIG. 11, so the reheater entrance is flush with the top of the refrigerant outlet manifold 316 ensures a straight return path in the tope leg 334 of the air return manifold 330 to facilitate manufacturing.

This flow arrangement reverses the flow direction of the reheat air, i.e., the direction of arrows 358 in FIG. 11, as compared to the flow direction in the embodiment of FIGS. 1–10, i.e., arrows 60 in FIG. 1. By entering the reheater 12' from the top as viewed in FIG. 11, there is less temperature difference to aid in superheating the refrigerant. But, the greater temperature difference at the other end of the unit causes more heat transfer at that end and offsets the loss. Tests reveal that this flow arrangement is very effective at achieving the drying objectives while at the same time providing the necessary superheating of the refrigerant. By way of example, in an illustrative heat exchanger 10', demister mesh pad is a mist eliminator available from ACS Industries Separations Technology of Houston, Tex. under the designation Style 4BA.

It is therefore apparent that the present invention accomplishes its intended objective. While an embodiment of the present invention has been described in detail, that is for the purpose of illustration, not limitation.

What is claimed is:

1. A heat exchanger comprising:
   a. a precooler and reheater core and a chiller core in adjacent relation;
   b. a first set of heat transfer passages extending through both of said cores through which incoming air passes serially through both cores in a first direction;
   c. said first set of heat transfer passages including heat transfer structures having fins disposed to influence the flow through said passages;
   d. a second set of heat transfer passages extending through said chiller core in heat exchange relationship with said first set of heat transfer passages and through which coolant passes in heat exchange relationship with incoming air and said second set of heat transfer passages including heat transfer structures therein;
   e. a third set of heat transfer passages extending through said precooler and reheater core in heat exchange relationship with said first set of heat transfer passages and through which cooled air from said chiller core passes in heat exchange relationship with the incoming air and said third set of heat transfer passages including heat transfer structures therein;
   f. manifold means for conducting chilled air from said chiller core to said third set of heat transfer passages and having a first section contiguous with said chiller core and a second section contiguous with both said chiller core and said precooler and reheater core;
   g. said fins in said first set of heat transfer passages causing the incoming air to flow in an undulating pattern along said first set of heat transfer passages which separates moisture from the incoming air as it flows along said first set of heat transfer passages in said chiller core; and
   h. said second section of said manifold means being isolated from moisture separated from said incoming air.

2. A heat exchanger according to claim 1, wherein said first and second sections of said manifold means are disposed at substantially right angles to each other.

3. A heat exchanger according to claim 1, wherein said first section of said manifold means is in fluid communication with said first set of heat transfer passages in said chiller core along substantially the entire length of said first section and wherein said second section of said manifold means has an outlet in fluid communication with said third set of heat transfer passages is said precooler and reheater core.

4. A heat exchanger according to claim 1, further including moisture separation means in said first section of said manifold means.

5. A heat exchanger according to claim 1, wherein said first section of said manifold means includes means for removing moisture separated from the incoming air.

6. A heat exchanger according to claim 1, wherein said heat transfer structures in said second set of heat transfer passages have fins in staggered relation to each other and disposed substantially perpendicular to the direction of flow through said passages.

7. A heat exchanger according to claim 1, wherein said heat transfer structures in said third set of heat transfer passages have fins disposed substantially parallel to the direction of flow through said passages.

8. A heat exchanger according to claim 7, wherein said heat transfer structures in said third set of heat transfer passages comprise offset square fins.

9. A heat exchanger according to claim 1, in combination with a refrigerated air dryer system.

10. A heat exchanger according to claim 1, further including:
    a. a source of coolant including a compressor;
    b. means for conducting coolant from said source to said second set of heat transfer passages in a direction toward one end of said chiller core;
    c. means for returning coolant to said source from said second set of passages in a direction away from another end of said chiller core;
    d. the air passing through said first set of heat transfer passages through said chiller core having a temperature profile such that the maximum temperature is near said another end of said chiller core; and
    e. so that the air passing through said first set of heat transfer passages near said another end of said chiller core and at said maximum temperature is utilized to superheat coolant returning to said source.

11. A method for precooling, chilling and reheating warm, moist compressed air in a refrigerated air dryer system comprising:
    a. providing a heat exchanger comprising a precooler and reheater core and chiller core in adjacent physical relation;
    b. passing warm, moist compressed incoming air through said precooler and reheater core to precool the incoming air;

c. passing the precooled incoming air from said precooler and reheater core into and through said chiller core;

d. passing coolant through said chiller core to heat exchange relationship with the incoming air to chill the incoming air;

e. said step of passing the precooled incoming air through said chiller core including causing an undulating flow pattern in the incoming air flowing through said precooler and reheater core and chiller core to increase turbulence and reduce velocity of the incoming air flowing through said precooler and reheater core and separate moisture from the incoming air while in said chiller core;

f. conducting chilled, dry air from said chiller core to said precooler and reheater core in a manner preventing introduction of separated moisture to said precooler and reheater core by directing said chilled, dry air exiting from said chiller core initially in a direction opposite the force of gravity so that separated moisture flows in a direction opposite that of said air exiting said precooler and reheater core;

g. passing the chilled, dry air through said precooler and reheater core in heat exchange relationship with the chilled, dry air to provide said precooling of the incoming air and to elevate the temperature of the chilled, dry air to provide output air at a temperature for use; and h. conducting output air from said precooler and reheater core to a location of use.

12. A method according to claim 11, further including withdrawing from said chiller core the moisture separated from the incoming air.

13. A method according to claim 11 further including:

a. providing a source of coolant including a compressor;

b. passing coolant from said source toward one end of said chiller core through said chiller core in crossflow relation to said incoming air and in heat exchange relationship therewith to chill the incoming air and returning coolant away from another end of said second core to said source;

c. the air passing through said chiller core having a temperature profile such that the maximum temperature is near said another end of said chiller core; and d. utilizing the air passing through said chiller core near said another end of said chiller core and at said maximum temperature to superheat coolant returning from said another end of said chiller core to said source.

14. A heat exchanger comprising:

a. a precooler and reheater core and a chiller core in adjacent relation;

b. a first set of heat transfer passages extending through both of said cores through which incoming air passes serially through both cores in a first direction;

c. said first set of heat transfer passages including heat transfer structures having fins disposed to influence the flow through said passages;

d. a second set of heat transfer passages extending through said chiller core in heat exchange relationship with said first set of heat transfer passages and through which coolant passes in heat exchange relationship with incoming air and said second set of heat transfer passages including heat transfer structures therein;

e. a third set of heat transfer passages extending through said precooler and reheater core in heat exchange relationship with said first set of heat transfer passages and through which cooled air from said chiller core passes in heat exchange relationship with the incoming air and said third set of heat transfer passages including heat transfer structures therein;

f. manifold means for conducting chilled air from said chiller core to said third set of heat transfer passages and having a first section contiguous with said chiller core and a second section contiguous with both said chiller core and said precooler and reheater core;

g. said fins in said first set of heat transfer passages causing the incoming air to flow in an undulating pattern along said first set of heat transfer passages which separates moisture from the incoming air as it flows along said first set of heat transfer passages in said chiller core;

h. said second section of said manifold means being isolated from moisture separated from said incoming air; and i. said precooler and reheater core and said chiller core being orientated so that said first section of said manifold means extends generally vertically and said second section of said manifold means extends generally horizontally.

15. A heat exchanger comprising:

a. a precooler and reheater core and a chiller core in adjacent relation;

b. a first set of heat transfer passages extending through both of said cores through which incoming air passes serially through both cores in a first direction;

c. said first set of heat transfer passages including heat transfer structures having fins disposed to influence the flow through said passages;

d. a second set of heat transfer passages extending through said chiller core in heat exchange relationship with said first set of heat transfer passages and through which coolant passes in heat exchange relationship with incoming air and said second set of heat transfer passages including heat transfer structures therein;

e. a third set of heat transfer passages extending through said precooler and reheater core in heat exchange relationship with said first set of heat transfer passages and through which cooled air from said chiller core passes in heat exchange relationship with the incoming air and said third set of heat transfer passages including heat transfer structures therein;

f. manifold means for conducting chilled air from said chiller core to said third set of heat transfer passages and having a first section contiguous with said chiller core and a second section contiguous with both said chiller core and said precooler and reheater core;

g. said fins in said first set of heat transfer passages causing the incoming air to flow in an undulating pattern along said first set of heat transfer passages which separates moisture from the incoming air as it flows along said first set of heat transfer passages in said chiller core;

h. said second section of said manifold means being isolated from moisture separated from said incoming air; and i. said heat transfer structures in said first set of heat transfer passages comprising rotated lanced fins.

16. A heat exchanger comprising:

a. a precooler and reheater core and a chiller core in adjacent relation;

b. a first set of heat transfer passages extending through both of said cores through which incoming air passes serially through both cores in a first direction;

c. said first set of heat transfer passages including heat transfer structures having fins disposed to influence the flow through said passages;

d. a second set of heat transfer passages extending through said chiller core in heat exchange relationship with said first set of heat transfer passages and through which coolant passes in heat exchange relationship with incoming air and said second set of heat transfer passages including heat transfer structures therein;

e. a third set of heat transfer passages extending through said precooler and reheater core in heat exchange relationship with said first set of heat transfer passages and through which cooled air from said chiller core passes in heat exchange relationship with the incoming air and said third set of heat transfer passages including heat transfer structures therein;

f. manifold means for conducting chilled air from said chiller core to said third set of heat transfer passages and having a first section contiguous with said chiller core and a second section contiguous with both said chiller core and said precooler and reheater core;

g. said fins in said first set of heat transfer passages causing the incoming air to flow in an undulating pattern along said first set of heat transfer passages which separates moisture from the incoming air as it flows along said first set of heat transfer passages in said chiller core;

h. said second section of said manifold means being isolated from moisture separated from said incoming air; and i. said heat transfer structures in said second set of heat transfer passages having fins in staggered relation to each other and disposed substantially perpendicular to the direction of flow through said passages, said heat transfer structures in said second set of heat transfer passages comprising rotated lanced fins.

17. A method for precooling, chilling and reheating warm, moist compressed air in a refrigerated air dryer system comprising:

a. providing a heat exchanger comprising a precooler and reheater core and chiller core in adjacent physical relation;

b. passing warm, moist compressed incoming air through said precooler and reheater core to precool the incoming air;

c. passing the precooled incoming air from said precooler and reheater core into and through said chiller core;

d. passing coolant through said chiller core to heat exchange relationship with the incoming air to chill the incoming air;

e. said step of passing the precooled incoming air through said chiller core including causing an undulating flow pattern in the incoming air flowing through said precooler and reheater core and chiller core to increase turbulence and reduce velocity of the incoming air flowing through said precooler and reheater core and separate moisture from the incoming air while in said chiller core;

f. conducting chilled, dry air from said chiller core to said precooler and reheater core in a manner preventing introduction of separated moisture to said precooler and reheater core;

g. passing the chilled, dry air through said precooler and reheater core in heat exchange relationship with the chilled, dry air to provide said precooling of the incoming air and to elevate the temperature of the chilled, dry air to provide output air at a temperature for use;

h. conducting output air from said precooler and reheater core to a location of use; and i. said step of conducting chilled dry air from said chiller core to said precooler and reheater core including conducting the air along a first path in a generally upward direction and then along a second path in a generally horizontal direction.

* * * * *